United States Patent Office 3,328,892
Patented July 4, 1967

3,328,892
PROCESS FOR DESWELLING A WATER-SWOLLEN, HIGHLY HYDROPHYLIC GEL FIBER
Eugene Herbert Man, Miami, Fla., assignor to E. I. du Pont de Nemours and Company, Wilmington, Del., a corporation of Delaware
No Drawing. Filed May 4, 1966, Ser. No. 547,456
9 Claims. (Cl. 34—9)

This is a continuation-in-part of United States Serial No. 148,066, filed October 27, 1961.

This invention relates to a process. More specifically, it relates to a process for deswelling a water-swollen, highly hydrophilic gel fiber.

In accordance with the present invention a process is provided for deswelling a water-swollen, highly hydrophylic gel fiber which comprises (1) intimately contacting the said swollen fiber with an aqueous concentrated solution of a salt from the class consisting of magnesium chloride, magnesium acetate, an alkali metal acetate and a salt of a multivalent anion with a cation from the class consisting of magnesium, ammonium and an alkali metal, (2) removing excess salt solution and (3) drying by removal of water. The deposited salt may be removed mechanically such as by shaking, scraping, or working, or in many instances, where not detrimental to the intended end use, left on the dried fiber.

Testing procedures

Samples used for tensile tests, basis weight and bending length determinations are conditioned at 70° F. (21° C.) and 65% relative humidity for at least 24 hours before testing under these conditions.

Tensile strengths and elongations are measured on 0.5 x 2 inch samples at an elongation of 50% per minute on an Instron testing machine. The results in pounds/inch, hereafter designated as lbs./in., are divided by the basis weight to give a normalized result.

Samples are soaked for 5 minutes in distilled water at 21° C. and then clamped in the tester and broken in air to determine wet strip-tensile strength.

Bending length is 0.5 the length of a strip of sample that bends under its own weight to a 45° angle. It is determined on a 1 x 6 inch sample on a Drape-Flex Stiffness Tester (made by Fabric Development Tests, Brooklyn, N.Y.).

Basis weights are expressed in ounces/square yards, hereafter designated as oz./yd.$^2$, and are based on the weight of the water-insoluble fibers present unless otherwise stated.

The liquid absorption of all samples is determined by soaking a small sample in an excess of the liquid at 25° C. unless otherwise designated (1 g. in 3000 g. of water) for about 5 minutes. The sample is removed from the liquid and spread out to cover a 5 x 5 cm. area on bleached sulfite blotter paper. The sample is placed between layers of blotter paper and loaded with a 3 kilogram weight to give a pressure of 120 g./cm.$^2$. Pressure is applied for five minutes after which the sample is removed and weighed, giving the wet weight. Then the sample is dried to constant weight using a Noble and Woods sheet dryer at 100° C. Absorbency equals the water absorbed (wet weight minus dry weight) divided by the dry weight.

All absorbencies of urine are measured in a salt solution of essentially the same composition as human urine [16 g. NaCl, 35 g. urea, 2 g. MgSO$_4$, and 3 g.

per liter of solution in distilled water]. All water absorbencies are measured in distilled water unless otherwise stated.

The dispersibility is determined in a 250 ml. filter flask having a side arm at the bottom of the wall and containing a magnetically rotated bar. The bar is 3.8 cm. long by 8 mm. in diameter, weighs 11.73 grams and is rotated at 485 revolutions per minute. A 3 x 3 inch sample is folded in half and inserted under the surface of the water (at the top side arm). Tap water at about 25° C. is added through the bottom tube at a rate of 0.70 liter/minute for a period of 2 minutes. The effluent liquid from the upper side arm is filtered and the residue dried to constant weight at 100° C. to give the weight of fibers dispersed. The contents of the filter flask are filtered after the test and dried to yield the weight of undispersed fibers. The percent dispersibility is equal to 100 times the weight of fibers dispersed divided by the total weight of fibers recovered. Conventional toilet tissues have a dispersibility of 7%.

The wickability of a sample is determined by fastening the ends of a 2 x 5.5 inch strip to a perforated metal plate with rubber bands, resting the end of the plate under about 0.5 inches of distilled water at about 25° C. at an angle of 25° to the level of the water and noting the time in minutes for the water to wick the sample for a distance of 5 inches or less from the top of the water.

The following examples are cited to illustrate the invention. They are not intended to limit it in any manner.

EXAMPLE 1

Conventional cotton linter sheets are steeped in caustic soda solution, and thereafter hydraulically pressed to a 3/1 (solids/liquids) press weight ratio. The sheets of alkali cellulose are then shredded, and held for subsequent processing in a refrigerated space at under 5° C. The cotton linter alkali cellulose so produced has the composition shown below:

|  | Percent by weight |
|---|---|
| Precipitatable cellulose | 31.2 |
| Sodium hydroxide | 15.75 |
| Water | 53.05 |

Twenty pounds of the above alkali cellulose are charged the a 12-gallon baratte. The baratte is rotated and warmed to an internal temperature of 25° C. at which time 2.13 pounds of carbon disulfide and 2.27 pounds of acrylonitrile is added over a ten-minute interval. During the simultaneous xanthation and cyanoethylation the temperature of the reaction mass is maintained at about 30° C. The reaction requires about 30 minutes and its termination is indicated by a cessation of the evolution of heat by the reaction mass. The cyanoethyl cellulose xanthate product is then dissolved in a 4% sodium hydroxide solution and cooled to 5° C. The solution is stored at 0° C. for 16 to 24 hours before using.

The aged solution from above is filtered through a filter press, dearated, heated to about 20° C. and pumped through candle filters to a spinneret having 2200 orifices of 0.003 inch diameter. The solution is extruded from the spinneret into a 48-inch long aqueous coagulating bath containing 9% H$_2$SO$_4$, 9% ZnSO$_4$, and 17% Na$_2$SO$_4$ at 60–65° C. The filament bundle is forwarded to a feed roll and a skew idler roll where regeneration of the yarn is completed. The regenerated yarn is forwarded to another feed roll-idler roll set where it is sprayed with a solution (35° C.) containing 17% Na$_2$SO$_4$ and 3% Na$_2$HPO$_4$ adjusted to a pH of 8.3 with NaOH to neutralize the acid in the yarn and keep it in a deswollen condition. The neutral yarn is passed through squeeze rolls to remove excess solution and then wound up on packages at 60 yards per minute.

A mixture containing 80 parts (based on dry weight of the water-insoluble fiber) of 0.5 inch staple from the yarn prepared as described above and 20 parts of viscose rayon 0.25 inch staple of 1.5 d.p.f. is added to water at 30° C. and well agitated to give a uniform dispersion containing 0.24% fibers in a stock chest. This slurry is diluted to a consistency of 0.09% and fed to a headbox on a Fourdrinier machine. The paper wire is 31 inches wide made of 7.5 mil diameter wire in a 70 x 52 mesh/inch construction. The partially drained paper containing swollen cyanoethyl cellulose is sprayed with a water solution containing 20% by weight of $Na_2SO_4$ at 40° C. at 2, 3, and 4.75 feet from the breast roll. The nozzles supply about 1.3 gallons/minute. The salt solution deswells the swollen fibers. The wet paper is passed from the couching roll to a pressing section where it is pressed and is then dried on rolls heated to 120° C. The dry paper has a basis weight (water-insoluble fiber) of 1.54 oz./yd.$^2$.

If the spray of salt solution is stopped, the process quickly becomes inoperable due to the swollen web firmly adhering to the paper wire so that the webs cannot be couched (i.e. transferred) to the pressing section.

EXAMPLE 2

*Sheets of various cellulose derivatives*

One pound of the alkali cellulose of Example I is added to a 5 liter baratte and the air evacuated. Fifty-three grams of ethylene oxide are added over a 90-minute period as it is revolved on its side in a 25° C. water bath. The baratte is flushed with nitrogen and the crumbs of the hydroxyethyl cellulose (HEC) are removed and dissolved in dilute aqueous NaOH at 0 to 10° C. to give a solution containing 6% of the cellulose ether and 7% caustic. The solution is frozen at −30 C., heated to room temperature, and filtered. The filtered solution is extruded through a spinneret containing 504 orifices of 3 mil diameter into a coagulating bath (12% $H_2SO_4$ and 18% $Na_2SO_4$) and the yarn neutralized as in Example 1. The dry yarn has a d.p.f. of 2.6, a dry tenacity of 0.98 g.p.d., a dry elongation of 9.8% (all reduced to a salt-free basis), an absorbency in water and urine at 25° C. of 12 and 11 g./g., respectively, and a D.S. of 0.61.

The cyanoethyl cellulose viscose of Example 1 is aged for 3 days at 25° C. and then spun and neutralized as in Example 1. The fibers of carboxyethyl cellulose (CbEC) are washed with 70° C. distilled water, deswollen with acetone and dried at 100° C. The fiber has a D.S. of carboxyethyl groups of 0.13 and a D.S. of cyanoethyl groups of 0.04. It has an absorbency in distilled water and urine at 25° C. of 34 and 8 g./g. respectively.

A solution of cyanoethyl cellulose (CNEC) is prepared according to British Patent No. 633,807 by adding the acrylonitrile to the viscose. The solution is spun to fibers and neutralized as in Example 1. The fibers have the following typical properties calculated on a water-insoluble fiber weight:

D.p.f. _____ 2
Water absorbency (25°), g./g. _____ 19.1
Urine absorbency (25°), g./g. _____ 14.0
Percent nitrogen _____ 3.4
Percent carboxyethyl _____ 0.4
D.S. (cyanoethyl) _____ 0.45
D.S. (carboxyethyl) _____ 0.015

A hand sheet labeled "a" and having a basis weight of 2.0 oz./yd.$^2$ is prepared from a mixture of 39% of 0.5 inch staple of the above HEC fiber and 61% of 0.25 inch viscose rayon. Other papers labeled "b," "c," and "d" and each having a basis weight of 1.43 oz./yd.$^2$ are formed from 100% of 0.5 inch staple of HEC, CbEC and CNEC respectively. Each paper is formed by deposition of an aqueous slurry of fiber upon a hand screen. The sheets so formed are deswelled by immersion of the sheet while on the screen in a concentrated (20%) solution of $Na_2SO_4$ in water. Each sheet, removed from its screen and dried by heating, is soft and absorbent.

EXAMPLE 3

Hand sheets are made from an aqueous slurry of 0.5 inch long cyanoethyl cellulose (CNEC) fibers (D.S.—CN of 0.59, D.S.—COOH of 0.028, with an absorbency of 19.7 g./g. in water) and 0.25 inch long rayon staple on a hand sheet mold. The water leaves are submerged while still on the screen in an aqueous solution containing 20% by weight of $Na_2SO_4$ for about 5 minutes. The deswollen leaves are lifted from the screen, placed between blotting paper and dried on a Noble and Woods sheet dryer at 100° C. until no water condenses on a cold beaker held above the sheet on the dryer. Papers containing 50% and 70% CNEC fibers are made in this manner to give items a and c. Control papers (items b and d for the same respective compositions) are made without the salt-deswelling step. The control water leaves (b and d) are so weak that they are carefully transferred from the screen to a polyester fabric before being placed between blotters and dried. Items a and c have the white color and soft handle of a blotting paper. They tear like a paper and show separate fibers at the torn edges. The control items b and d have the transparent appearance and harsh, stiff handle of a parchment paper. They tear like a film and do not show separate fibers at the torn edges.

Samples of all the items are tumbled in a home laundry dryer at about 45° C. with 4 soft baseballs for various periods indicated in Table I to further soften them. Items a and c are significantly softened by the treatment as shown by the bending length. Items b and d are unchanged by the treatment. A comparison of various properties of the papers is made in Table I.

TABLE I

|  | a | b | c | d |
|---|---|---|---|---|
| Drying time, minutes | 8 | 8 to 9 | 7-8.5 | 14.5-17 |
| Wickability, height inches/minutes | 5/13 | 3.75/120 | 5/49 | 1/120 |
| Absorbency, g./g. distilled water | 8.9 | 6.7 | 13.7 | 8.9 |
| Thickness, mils with Waltham Gage ca. 10 p.s.i. | 6.7 | 4.2 | 6.6 | 3.2 |
| Bending length, cm.: |  |  |  |  |
| As-dried | 6.3 | 5.7 | 6.5 | 5.0 |
| After softening | 3.8 | 5.9 | 4.0 | 5.0 |
| Dispersibility, percent | 89.6 | 0 | ca. 90 | 0 |
| Basis Weight, oz./yd.$^2$ | 1.47 | 1.37 | ca. 1.50 | 1.52 |

EXAMPLE 4

Hand sheets containing 70% CNEC fibers of Example 3 and 30% rayon are made, the dry sheets having a basis weight (water-insoluble weight) of 2 ounces/yd.$^2$. The water leaves are treated with various salt solutions and dried as in Example 3. Sheet properties are tabulated in Table II. The density is calculated from the dried height as measured on a Waltham gauge and the weight of the salt-free fibers in the dry sample.

TABLE II

| Item |  | Solution, percent | Absorbency, g./g. | Wicking, ht./min. | Density, g./cc. | Height, mils |
|---|---|---|---|---|---|---|
| a | Ammonium sulphate | 30 | 13.1 | 5/13.5 | 0.27 | 10.1 |
| b | Magnesium sulphate | 20 | 12.2 | 5/39 | 0.26 | 9.0 |
| c | Sodium sulpahte | 20 | 13.7 | 5/49 | 0.30 | ------ |
| d | Sodium citrate | 17.6 | 12.8 | 5/62.5 | 0.37 | 6.4 |
| e | Sodium acetate | 20 | 8.7 | 3.25/120 | 0.37 | 5.2 |
| f | Sodium sulphate | 10 | 13.0 | 3.75/120 | 0.51 | 5.1 |
| g | Sodium sulphate | 5 | 12.7 | 3.75/120 | 0.51 | 4.1 |
| h | Sodium chloride | 20 | 8.6 | 2.25/120 | 0.59 | 3.6 |
| i | None (water) | ------ | 8.9 | 1/120 | 0.61 | ------ |

Other similar experiments show that magnesium acetate, magnesium chloride, ammonium chloride and ammonium sulphate are effective deswelling agents as 1.67 M solutions.

EXAMPLE 5

Thirty-three grams of rayon tow (1.5 d.p.f.) are steeped in 18% aqueous NaOH at 18° and pressed to a wet weight of 92 grams. The fibers are loosened by hand while protected from atmospheric $CO_2$ by a plastic bag and wound in a loose spiral on a 4-inch bobbin. The bobbin is rotated in a closed resin kettle at 50° and 18 grams of acrylonitrile is placed in the bottom of the kettle. The AN vapor is reacted with the cellulose and the resulting cyanoethyl cellulose is hydrolyzed to carboxyethyl cellulose by the alkali present. After 2 hours the product is acidified in a 5% sulfuric acid-15% sodium sulfate solution, then neutralized to the salt form in 3% sodium phosphate-17% sodium sulfate solution adjusted to a pH of 8.5.

The product has a carboxyl D.S. of 0.23 and a cyanoethyl D.S. of 0.034. The fiber is cut into ½-inch length staple. The moist mass contains 35.4 cellulosic materials, 92% of which is insoluble in 1% sodium sulfate.

Hand sheets are made by dispersing 3.95 grams of the above moist staple (equivalent to 1.288 grams of insoluble fiber) plus 0.43 gram of 0.25 inch rayon staple in 6 liters of water containing 1% by weight of sodium sulfate. A Noble and Woods sheet mold is used in the usual way. The wet waterleaf on the screen is too tender to handle and is dewatered by careful immersion in a 20% solution of sodium sulfate. The deswelled sheets are then couched between blotters and dried on a hot plate at 125° C. The dried sheets are smooth, white and flexible and can readily be redispersed in water. Sheets dried without first deswelling are crinkled, translucent and horny. They cannot be redispersed in water.

EXAMPLE 6

Surgical cotton is hydroxyethylated by treatment with caustic soda and ethylene oxide in turn. The reaction product is neutralized (in a solution of 3% $Na_2HPO_4$ and 16% $Na_2SO_4$ adjusted to a pH of about 8.5). The product has a D.S. of 0.7 with an absorbency of 15 g./g. in ice tap water. Hand sheets are made containing 75% of the above fiber and 25% of 0.25 inch rayon staple. The sheets are dewatered for 10 minutes in an aqueous 20% sodium sulfate solution.

The nature of the hydrophylic gel fiber is not critical. In addition to those specifically illustrated above, the technique of the present invention can be applied to fibers of cyanoethyl cellulose, hydroxyethyl cellulose, carboxyethyl cellulose, carboxymethyl cellulose, methyl cellulose, the sulfopropyl ether of cellulose, polyvinylacetate (99% hydrolyzed), the potassium sulphonate of polyvinylalcohol, carboxymethylated polyvinylalcohol, polyethylene oxide cross-linked with 10% diethyl itaconate and the ammonium salt of oxycellulose.

The identity of the salt useful in aqueous solution for deswelling the swollen gel fiber in accordance with the technique of the present invention is critical. Although a wide variety of salts may be used as illustrated in the specific examples, 1.6 molar solutions of calcium chloride, ammonium nitrate and the iodides of magnesium, sodium and ammonium actually swell the fibers rather than deswell them.

The salt solution should be at least 0.7 molar and preferably at least about 1.2 molar (e.g., about 15% $Na_2SO_4$) and is generally used at 30 to 60° C. or higher to minimize precipitation of the salt.

If the highly hydrophilic fiber contains ionic substituents that can yield an anionic group on the fiber (e.g., carboxylic or sulfonate), the use of a multivalent cation salt will cause cross-linking which will decrease the absorbency of the dried product. A monovalent cation should be used in this case.

Any method of accomplishing intimate contact between the aqueous salt solution and the swollen gel fiber is suitable, such as by immersion, preferably with agitation, or spraying. The period of contact need not be long for most purposes. Periods as high as 5 minutes or longer are highly advantageous for highly swollen fibers although contact periods as short as 3 to 10 seconds will often accomplish noticeable results. Excess salt solution may be removed by mechanical means such as wringing or centrifuging. Salt deposited upon the fiber upon removal of water may be removed mechanically such as by shaking, scraping or working the fiber, sheet, or fabric of which the fiber constitutes an element. For many applications removal of excess salt is not necessary, since presence of salt does not appear to influence the softness of the resulting product.

The dry, salt-deswollen, fibrous products of this invention are valuable for use as absorbing pads for body fluids in a relatively unbonded form such as papers, batts, webbs, etc., or they can be bonded into integral structures which have adequate strength and durability in use and are suitable for disposal in sewage systems after use.

Many equivalent modifications of the present invention will become apparent to those skilled in the art from a reading of the above without a departure from the inventive concept.

What is claimed is:

1. A process for deswelling a water-swollen, highly hydrophylic gel fiber which comprises (1) intimately contacting the said swollen fiber with an aqueous concentrated solution of a salt from the class consisting of magnesium chloride, magnesium acetate, an alkali metal acetate and a salt of a multivalent anion with a cation from the class consisting of magnesium, ammonium and an alkali metal, (2) removing excess salt solution and (3) drying by removal of water.

2. The process of claim 1 wherein the said swollen fiber is a cellulose derivative.

3. The process of claim 2 wherein the said cellulose derivative is a cellulose ether.

4. The process of claim 3 wherein the said ether is cyanoethylated cellulose.

5. The process of claim 4 wherein the said cyanoethylated cellulose fiber is a fiber of regenerated cyanoethylated cellulose.

6. The process of claim 3 wherein the said cellulose derivative fiber is a surface treated fiber of cellulose.

7. The process of claim 1 wherein the said salt is sodium sulfate.

8. The process of claim 7 wherein the said salt is present at a concentration in water of from about 15% to about 30% by weight.

9. The process of claim 1 wherein the said swollen fiber contains ionic substituents.

References Cited

UNITED STATES PATENTS 2,824,779   2/1958   Reeves et al. _____ 260—231

OTHER REFERENCES

Pages 62, 63 and 88 of the article "New Family of Rayons" in British Rayon and Silk Journal for May 1950.

FREDERICK L. MATTESON, JR., *Primary Examiner.*

DONLEY J. STOCKING, *Examiner.*

J. J. CAMBY, *Assistant Examiner.*